Sept. 29, 1970   H. KOETHKE   3,530,989
FILTER APPARATUS FOR GASEOUS LIQUID

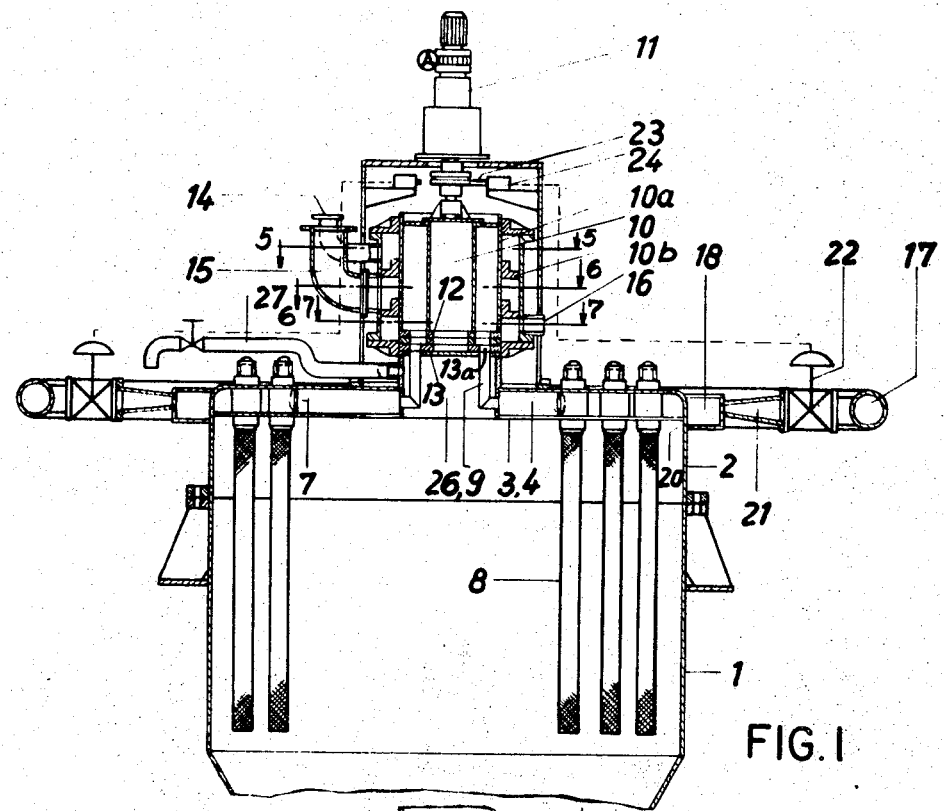
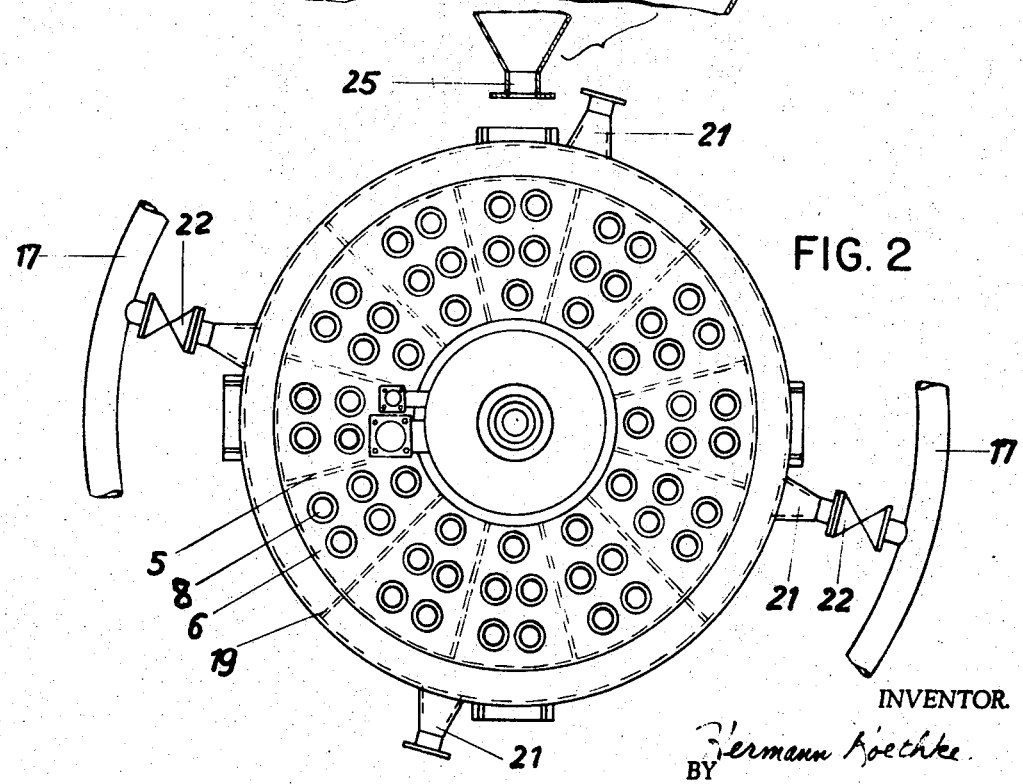
FIG. 1
FIG. 2

Filed Jan. 9, 1967   3 Sheets-Sheet 2

INVENTOR.
Hermann Koethke
BY
Learman & McCulloch

INVENTOR.
HERMANN KOETHKE

United States Patent Office 3,530,989
Patented Sept. 29, 1970

3,530,989
FILTER APPARATUS FOR GASEOUS LIQUID
Hermann Koethke, Westphalia, Germany, assignor to H. Putsch & Comp., Hagen, Westphalia, Germany, a corporation of Germany
Filed Jan. 9, 1967, Ser. No. 607,938
Int. Cl. B01d 29/30
U.S. Cl. 210—188                                         11 Claims

ABSTRACT OF THE DISCLOSURE

A thickening filter having a housing defining a closed reservoir to the upper end of which turbid liquid is introduced radially under sufficient pressure to move gas along a path leading to a gas collector provided at the upper end of the reservoir. The liquid may be introduced peripherally or centrally of the reservoir and the gas collected centrally or peripherally, respectively, thereof. The introduction of liquid may be circumferential or may proceed in angular stages. Atop the reservoir is a plurality of separate, segment shaped chambers and atop the chambers is a cover. Filter candles extend through the cover and the chambers into the reservoir for the transfer of liquid between the latter and the chambers, but are accessible from outside the cover.

---

The invention relates to a filter apparatus especially adapted for processing sugar and more particularly to a continuously operable thickening filter having a rotor through which individual filter elements of a group of such elements immersed in turbid liquid can be connected in succession and periodically with at least one filtrate discharge pipeline and one supply pipeline for a medium under pressure for the purpose of pushing off into the remainder of the turbid liquid any solids which have settled on the filter elements.

The filtration of suspensions by means of continuously operating filters, such as revolving vacuum filters, for example, often necessitates a prior increase in the amount of solids contained in the turbid liquid in order to increase the performance of these filters or to render their use economical. This increase in the solid content is generally brought about by separating and discharging as large a portion as possible of the liquid phase in which the solids are suspended. For this operation so-called settling vessels and decanters are used and in many cases hydrocyclones or centrifuges also are used. According to the type of turbid liquid and the solid particles contained therein, either the relatively long period spent in the settling vessels and decanters has a harmful effect on the clarified liquid, for example discoloration, or the resulting clarified liquid is not perfectly free from extremely small particles of solid and has to be re-filtered. So-called thickening filters are also known in which the turbid liquid is partially filtered and the solids which have accumulated on the filter elements are pushed off in various ways and added to the remainder of the turbid liquid in the filter housing so that the concentration of solids rises to a value favorable to the continuous filtering off of the solids, by way of revolving vacuum filters for example.

Thickening filters of the foregoing kind may operate intermittently, i.e. non-continuously, and also continuously. In the thickening filters which operate non-continuously the working cycle consists essentially of the following processes:

filling of the filter housing with turbid liquid of low concentration, filteration with discharge of the clear fluid, i.e., the filtrate, pushing off of the solids which have accumulated on the filter elements during filtration into the remainder of the turbid liquid in the housing, drainage from the housing of the residual turbid liquid enriched with solids.

A fresh working cycle then begins and proceeds as described above.

In the continuously operating thickening filters all these processes take place simultaneously, i.e., after the initial filling of the filter housing there is an uninterrupted supply of low-concentration turbid liquid, a constant discharge of filtrate and a continuous draining off of turbid liquid enriched with solids. With reference to a single filter element or group of filter elements the process steps of filtration and pushing off of solids are thereby controlled rhythmically.

In a known, continuously operating thickening filter this is carried out in a manner by which, in a vertical cylindrical housing, filter elements disposed upright and radially in relation to the central axis and having a plate-like construction are fixed to a central shaft with which they rotate around the central axis. From each filter element a pipeline leads to a control device, for example of the type of control head which is customary in rotary cell filters, disposed outside the housing. Through the rotation of the filter elements in the housing the filtrate is led off from each filter element through the pipeline referred to, in co-operation with the control head, and a suitable medium, usually filtrate, is led in at intervals to the filter element is order to push off the solids. The solids which have been pushed off drop down into the lower part of the vessel and here they are carried out mixed with a quantity of turbid liquid. This known form of construction has disadvantages, however, since currents and eddies are developed in the turbid liquid as a result of the motion of the filter elements and this interferes with the descent of the solids. Moreover it is difficult to provide the filter elements with new filter media, e.g. filter cloths, because the entire filter housing has to be opened for the purpose.

It is an object of this invention to obviate these disadvantages, i.e., to provide a continuously operating thickening filter apparatus in which any currents which could interfere with the precipitation of the solids are prevented while at the same time providing for easy accessibility of the filter elements for the purposes of cleaning and exchange.

This object is achieved by the thickening filter according to the invention in that the individual filter elements are disposed in a fixed manner and open out singly or in groups into a series of separate, fixed chambers which in turn are communicable with the control head which is the only part to be motor driven.

Another object of the invention is to provide a filter apparatus which enable the retention time of the clarified liquid to be reduced, thereby avoiding color and other degradation of the liquid. A further object of the invention is to provide for the more accurate control of the density of the settled solids.

In the disclosed embodiments, filtering candles of known construction preferably are used for the filter elements. These can be provided so as individually to be insertable in the cover of the filter housing and from the outside of the latter. To this end the cover is conveniently provided with an intermediate base which, together with preferably radial partition walls, constitutes the chambers which communicate in each case with a group of the filtering candles on the one hand and the control head on the other. In consequence of the rotation of the control head, the filtrate is removed or collected from the individual chambers in succession, continuously, and the medium for pushing off the solids of the so-called filter cake, deposited on the filter elements, is supplied to the individual chambers in succession continuously. It is also possible, however, at any time for several chambers to be brought into communication with the control head through a common pipeline.

To prevent the filter cake which has been pushed off from becoming re-deposited on the filtering candles during the subsequent filtration process, enough time is left between the pushing off and the start of the fresh filtration in the chamber or group thereof for the pushed off solids to sink into the mud collecting area of the housing. During this time all drainage from and supply to the chamber or group of chambers is blocked by the control head.

In this connection it is also important that no isolated particles from the filter cake be carried upwards by any gases which may enter the filter housing with the turbid liquid and collect under the cover. To this end the turbid liquid is fed in, for example, through a number of horizontal, slit-like apertures disposed on the top edge of the housing so that the incoming stream of liquid covers a large zone and the bubbles of gas rising to the outer zones of the housing are driven to the middle. Here, the flow energy of the incoming liquid should be so adjusted in magnitude that the accumulation of gas and solids in the filtering zone is reliably prevented.

However, if the admission of turbid liquid should take place simultaneously over the entire periphery of the housing, the velocity of and turbulence generated by the inflowing turbid liquid may be undesirable. For this reason, according to a further feature of the invention, the individual orifices in the housing wall are operated in succession individually or in groups, so that the turbid liquid is admitted in four zones, for example, in rotation. For this purpose admission to the individual inlet orifices can be provided with control valves which can be actuated pneumatically, hydraulically or electrically.

According to another exemplary embodiment of the invention the turbid liquid enters at about the middle of the housing cover, whereby a baffle plate deflects the incoming stream of liquid radially outwards. In this case the gases are exhausted at the periphery of the housing. For this purpose, at approximately the same point as the inlet orifices referred to previously, outlet orifices are provided which communicate by way of throttle valves with a gas discharge pipe. Here there is no need for control of any valves since the throttle valves can be adjusted manually according to the amount of gas to be drawn off.

Further details and advantages of the invention will become apparent from the following description of two exemplary embodiments which are represented in the drawings in which:

FIG. 1 is a vertical section of one embodiment of the invention;

FIG. 2 is a top plan view of the embodiment shown in FIG. 1;

Figure 5:
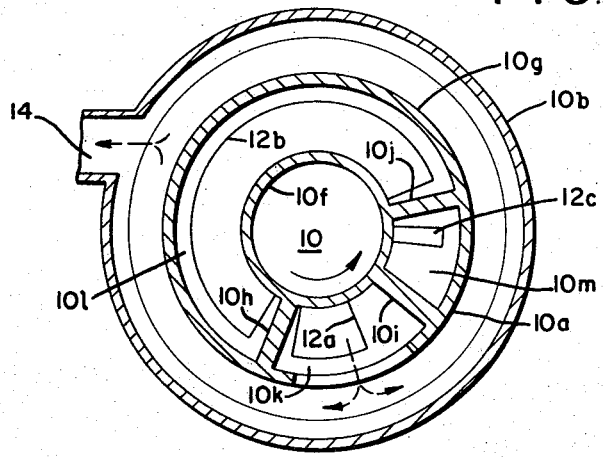
Figure 6:
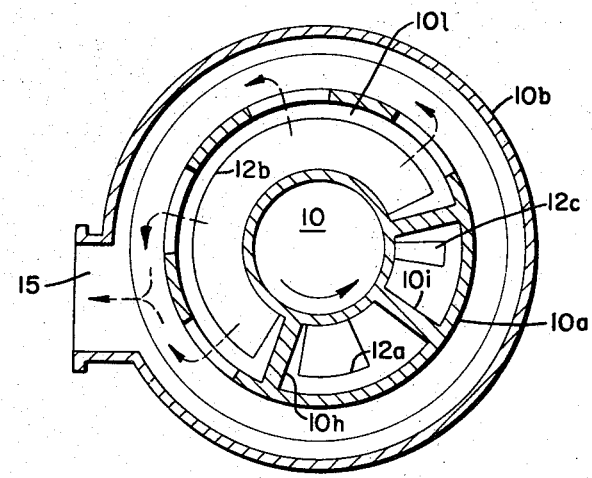
Figure 7:
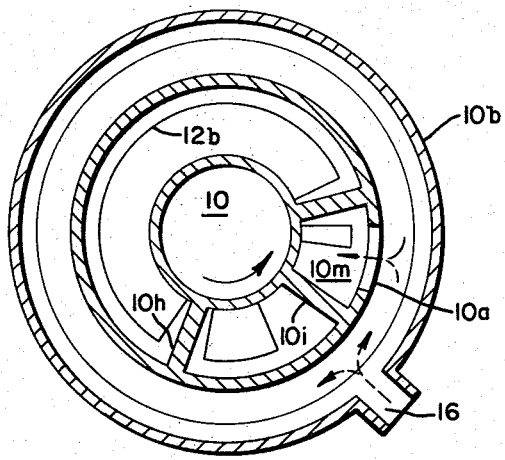

FIGS. 5, 6 and 7 are sectional views taken on the lines 5—5, 6—6 and 7—7, respectively, of FIG. 1.

In both embodiments the reference character 1 indicates a substantially cylindrical filter housing forming a turbid liquid reservoir closed at the top by a cover 2 having an intermediate base 3 which, with the cover 2, forms a space 4. The space 4 in the cover is subdivided by radially extending walls 5 into individual chambers 6. Each of these chambers 6 communicates by way of apertures 7 with a number of filtering candles 8 which are inserted in the cover 2 from the outside, whereby their heads project through the top surface of the cover and also through the intermediate base 3, the points of passage being sealed. Through the openings 7 filtrate can pass from the interior of the filtering candles 8 into the corresponding chambers 6 or the medium for pushing the filter cake off can pass into the interior of the filtering candles 8 from the chambers 6.

From each of the chambers 6 a pipeline 9 leads to a control head 10 of known construction which is connected to a motor driven unit 11. By means of the unit 11 a rotor 10a, journaled in the control head, may be set in rotation in order to control, by means of an apertured governing cam 12 and a stationary apertured disc 13, the discharge of the turbid filtrate and the clear filtrate, the pushing off of the filter cake, and the interval. The cam 12 has three apertures 12a, 12b and 12c, and the stationary disc 13 has a plurality of apertures 13a, each of which communicates with a pipe 9.

The control head 10 consists substantially of the rotor 10a already mentioned at the lower end of which is fixed the cam 12 for rotation with the rotor and a housing portion 10b rigidly connected with the cover 2 of the filter housing and having three collecting chambers 10c, 10d, and 10e, situated one above the other, for the turbid filtrate, the clear filtrate, and the medium for the pushing off of the filter cake, as well as the associated pipe connections for the pipe lines 14, 15 and 16. The rotor 10a has concentric inner and outer walls 10f and 10g, and is divided by walls 10h, 10i and 10j extending radially in relation to its axis of rotation into three chambers 10k, 10l and 10m which take up the turbid filtrate and the clear filtrate from out of the filtering channels 8, with a rhythm determined by the registration of the apertures in the cam 12 with the apertures 13a in the disc 13, and carry them off through corresponding apertures into the collecting chambers of the housing portion 10b, or cause the medium for removing the filter cake to pass from these chambers into the filtering candles 8 as the case may be. This medium preferably is a small quantity of clear filtrate previously discharged from the housing. The reference character 14 indicates the discharge outlet for the turbid filtrate, 15 that for the clear filtrate and 16 the supply inlet for the medium for pushing off the filter cake.

The constructions described so far relate to both of the exemplified embodiments. In a corresponding manner the parts which are common to both embodiments have been given the same reference numbers.

In the first exemplary embodiment as shown in FIGS. 1 and 2 the turbid liquid is conducted to the filter housing 1 through an annular pipeline 17 surrounding the cover 2. An annular channel 18 is provided on the periphery of the cover 2 and is divided into individual segments by transverse walls 19. Orifices 20 located at short distances beneath the intermediate base 3 provide communication between the channel 18 and the interior of the housing 1. Each segment of the annular channel 18 is conected with the annular pipeline 17 by a pipe 21. Provided in the pipes 21 are valves 22 which, as shown by the dotted line in FIG. 1, are opened and closed alternately by pneumatic, hydraulic or electrical means in a known manner through cams 23 provided on the shaft of the control head rotor 10a and switches 24 co-operating therewith. Turbid liquid can be discharged from any one of the segments of the annular channel 18, or from any number thereof simultaneously.

For the purpose of collecting the solids which are pushed off the filtering candles 8 or rather for carrying away the turbid concentrate containing these solids, the filter housing 1 has a conical base which opens into an outlet 25. The quantity which is drawn off can be adjusted by a regulating valve, not shown, disposed under the outlet 25.

The control head 10 is situated on a dome 26 provided in the centre of the filter housing cover 2, in which dome the gas which is carried in with the turbid liquid collects as a foam and from which it can be led off through a pipe 27. In this way, and also through the arrangement and the alternate operation of the orifices 20 for the admission of the turbid liquid, the gas which gains admission to the filter with the turbid liquid is prevented from affecting adversely the process of settling of the solids.

Figure 3:
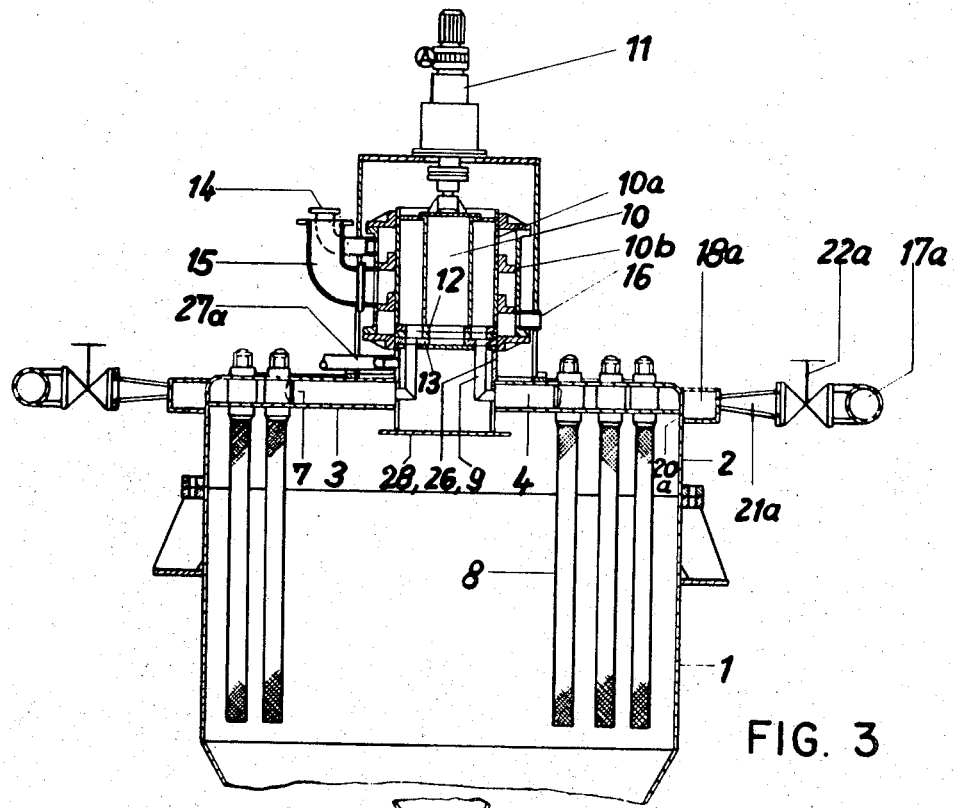
FIG. 3 is a vertical section of a modified embodiment.
Figure 4:
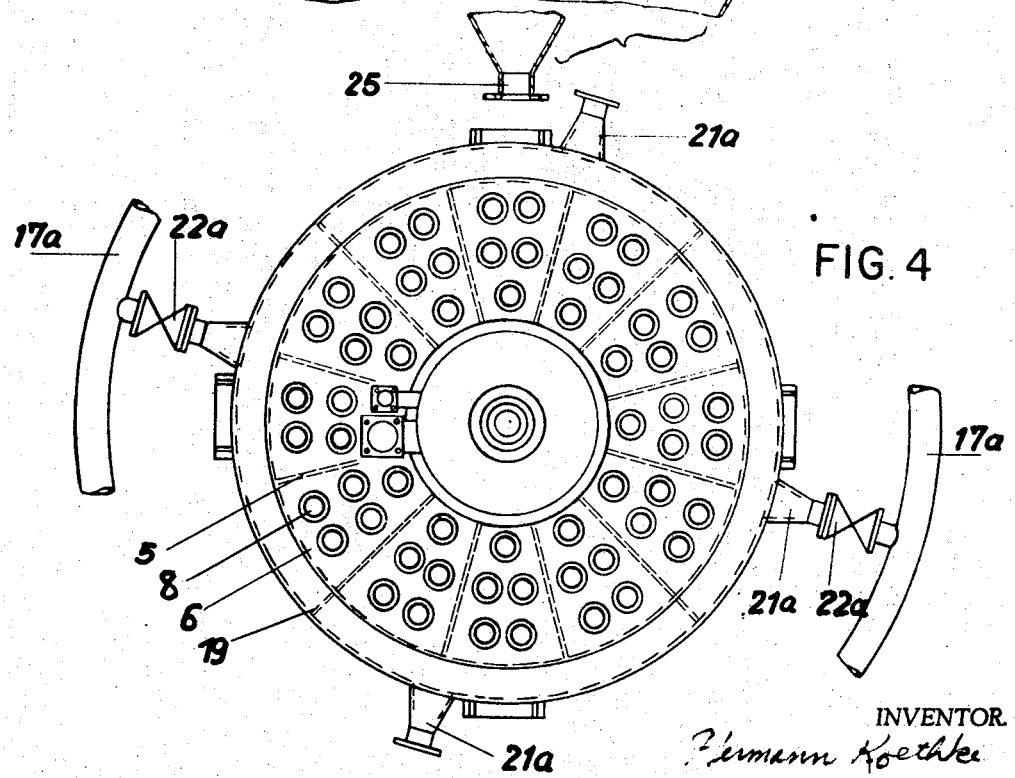
FIG. 4 is a top plan view of the embodiment shown in FIG. 3.

In the modified form of construction shown in FIGS. 3 and 4 the turbid liquid is fed into the filter housing 1 through a pipeline 27a which is located in the same place as the gas discharge pipeline 27 previously mentioned. Provided under the dome 26 there is a baffle plate 28 by means of which the incoming flow of liquid is diverted in a horizontal and radial direction. As a result the gases and solid particles which have been carried along and which are ascending from the turbid liquid already in the filter housing are driven to the periphery of the housing, where they can pass through orifices 20a into an annular channel 18a which occupies the same position as the previously mentioned annular channel 18 for the supply of the turbid liquid. From the annular channel 18a the gases pass through pipes 21a in which there are inserted throttle valves 22a which can be opened more or less wide according to the quantity of gas involved and the gases are then carried off into an annular pipeline 17a, situated in the same position as the previously mentioned annular pipeline 17, for the supply of the turbid liquid. The throttle valves 22a are provided for the purpose of maintaining the necessary positive pressure in the filter housing and making it possible to regulate the flow of the gases in the various directions.

It is obvious that the last-described construction coincides extensively with that described first so that, on the other hand, one of the forms of embodiment described can be operated in different ways with only minor modifications.

In the operation of the apparatus shown in FIGS. 1 and 2 turbid liquid can be introduced continuously to the housing 1 from any selected one or all of the segmental chambers in the annular channel 18 and under sufficient head or pressure to cause the liquid to pass through the filter candles 8. Filtrate from the candles 8 will be delivered to the chambers 6 from one or more of which, in succession, the filtrate will be delivered via the associated pipeline 9 to the discharge outlets 14 and 15 as the rotor 10a rotates. As the rotor 10a rotates from communication with each chamber 6 into communication with the next leading chamber or group, communication will be established between the trailing chamber and the pipeline 16 so as to enable wash liquid, such as water or previously collected filtrate, to be introduced from the supply line 16 into the trailing chamber and through the associated filter candles 8 so as to push off the filtering media of the latter the filter cake deposited thereon during the filtering process. The cake thus pushed off will settle to the bottom of the housing 1 for discharge through the outlet 25. Any gas accumulated in the housing is discharged through the dome 26 and through the pipeline 27.

The operation of the apparatus shown in FIGS. 3 and 4 is the same as that just described except that the turbid liquid is introduced to the interior of the housing at the center thereof via the pipeline 27a and the baffle 28, and the gas is discharged to the annular channel 18a via the vent openings 20a.

I claim:

1. Filter apparatus for filtering a gaseous liquid, said apparatus comprising a closed housing forming a cylindrical reservoir for liquid to be filtered; cirmumferentially arranged liquid supply means in communication with said reservoir at the peripheral upper end thereof constructed and arranged to introduce said liquid radially inwardly of said reservoir from a plurality of circumferentially spaced locations under sufficient pressure to drive gas in a path radially inwardly of said reservoir; means in communication with the upper end of said reservoir and in the path of said gas for collecting said gas; means forming a plurality of chambers separate from one another and from the interior of said housing, said chambers being fixed relative to said housing; at least one filter element in communication with each of said chambers and with said reservoir and through which said liquid may be filtered and delivered to said chambers; receiver means for receiving filtrate from said chambers; and rotor means rotatable relatively to said chambers and operable to establish successive communication between said receiver means and a selected number of said chambers.

2. The conntruction set forth in claim 1 wherein said liquid supply means comprises a plurality of liquid inlets circumferentially spaced from one another, valve means operable to open and close said inlets and means for operating said valve means in sequence whereby said liquid may be introduced to said reservoir in angularly successive stages.

3. Apparatus as set forth in claim 1 including wash liquid supply means; and rotor means operable to establish successive communication between said supply means and said chambers for delivering wash liquid through said chambers and through said filter elements into said reservoir.

4. Apparatus as set forth in claim 1 wherein said filter elements are accessible externally of said housing.

5. Apparatus as set forth in claim 1 wherein the means for collecting said gas is at the center of said reservoir.

6. Apparatus as set forth in claim 1 including means for limiting the introduction of said liquid to said reservoir to a portion only of the periphery thereof.

7. Apparatus as set forth in claim 1 wherein the means for introducing said liquid to said reservoir comprises a plurality of inlets spaced uniformly about the circumference of said reservoir; valve means for selectively enabling and disabling the flow of liquid from any one of said inlets to said reservoir; and means operable in response to rotation of said rotor means for controlling said valve means.

8. In filter apparatus for filtering liquid in which gas may form and pass upwardly through the liquid, said apparatus comprising a closed, generally cylindrical reservoir for containing said liquid, a plurality of filter elements extending into said reservoir for immersion in said liquid, and means for receiving filtrate from said filter elements: the improvement comprising circumferentially arranged liquid supply means in communication with said reservoir at its peripheral upper end constructed and arranged to introduce said liquid to said reservoir radially inwardly of the latter from a plurality of circumferentially spaced locations under sufficient pressure to drive gas in a path radially inwardly of said reservoir; and gas collecting means at the upper end of said reservoir and in the path of said gas for receiving such gas.

9. The construction set forth in claim 8 wherein said liquid supply means comprises a plurality of liquid inlets spaced circumferentially from one another, valve means operable to open and close said inlets, and means for operating said valve means in sequence whereby said liquid may be introduced to said reservoir in angularly successive status.

10. The construction set forth in claim 8 including means mounting said filter elements for access thereto externally of said reservoir.

11. Filter apparatus for filtering a gaseous liquid, said apparatus comprising a closed housing forming a cylindrical reservoir for liquid to be filtered; means in communication with said reservoir at the upper end thereof for introducing liquid radially of said reservoir under sufficient pressure to drive gas in a path radially of said reservoir; means in communication with said reservoir and in the path of said gas for collecting said gas; means forming a plurality of chambers within said housing separate from one another and from said reservoir, said chambers being fixed relative to said housing; at least one filter element passing sealingly through each of said chambers and extending from said reservoir to the exterior of said housing so as to be accessible externally thereof, each of said filter elements having an opening therein in communication with its associated chamber for delivering filtered liquid from said reservoir to said chambers; receiver means for receiving filtrate from said chambers; and rotor means rotatable relatively to said chambers and operable to establish successive communication between said receiver means and a selected number of said chambers.

References Cited

UNITED STATES PATENTS

| | | | |
|---|---|---|---|
| 1,716,040 | 6/1929 | Genter | 210—333 X |
| 3,356,215 | 12/1967 | Miles | 210—333 X |
| 2,784,846 | 3/1957 | Olson et al. | 210—456 X |
| 2,811,218 | 10/1957 | Winslow | 210—436 X |
| 3,017,032 | 1/1962 | Urdanoff | 210—456 X |

SAMIH N. ZAHARNA, Primary Examiner

U.S. Cl. X.R.

210—232, 340, 411